United States Patent [19]

Sauer et al.

[11] Patent Number: 4,533,879
[45] Date of Patent: Aug. 6, 1985

[54] INTEGRATED CIRCUIT KIT WITH A PHASE-LOCKED LOOP FOR COLOR TELEVISION RECEIVERS

[75] Inventors: Wolfgang Sauer, Freiburg; Friedrich Schmidtpott, Gundelfingen; Hermanus Schat, Freiburg; Laurin C. Freyberger, Bahlingen, all of Fed. Rep. of Germany

[73] Assignee: ITT Industries, Inc., New York, N.Y.

[21] Appl. No.: 536,287

[22] Filed: Sep. 27, 1983

[30] Foreign Application Priority Data

Oct. 22, 1982 [EP] 10221982 .................. 82109740.9

[51] Int. Cl.$^3$ .............................................. H03L 7/00
[52] U.S. Cl. .................................... 331/1 A; 331/17; 331/25
[58] Field of Search ........................... 331/1 A, 17, 25

[56] References Cited

U.S. PATENT DOCUMENTS 4,437,072 3/1984 Asami ................................. 331/1 A
4,459,559 7/1984 Crowley ............................ 331/1 A Primary Examiner—Eugene R. LaRoche
Assistant Examiner—Robert J. Pascal
Attorney, Agent, or Firm—Donald J. Lenkszus

[57] ABSTRACT

An improved kit of two integrated circuits having a phase-locked loop clock oscillator for use in a color television receiver utilizing digital signal processing is described. The voltage controlled oscillator and the phase discriminator of the phase-locked loop are each located in a different one of the two integrated circuits. The control signals for the voltage controlled oscillator are transferred into it via a two-wire digital bus. External discrete components are eliminated.

7 Claims, 5 Drawing Figures

INTEGRATED CIRCUIT KIT WITH A PHASE-LOCKED LOOP FOR COLOR TELEVISION RECEIVERS

BACKGROUND OF THE INVENTION

This invention pertains to a kit of two integrated circuits (IC's) for a color television receiver with digital signal processing. The IC's contain a clock oscillator realized in the form of a phase-locked loop, for producing two phase clock signals. The phase comparator stage of the phase-locked loop is arranged in the first integrated circuit, and the voltage-controlled oscillator thereof is arranged in the second integrated circuit. The voltage control signals thereof are supplied via a maximum of two connecting lines from the first to the second integrated circuit. Such an IC kit is described on pages 1-3 and 1-4, 4-1 to 4-14 and 8-1 to 8-5 of the Intermetall book, "DIGIT 2000 VLSI-Digital-TV-System", March 1982. The pages beginning with the numeral 4 refer to the integrated circuit MAA 2200, and the pages beginning with the numeral 8 refer to the integrated circuit MEA 2600. On page 8-2 it is stated that the voltage-controlled oscillator as integrated into the integrated circuit MEA 2600 forms part of a phase-locked loop, with the other part thereof, i.e., the phase comparator, being integrated into the integrated circuit MAA 2200. The phase comparator stage supplies control signals to an external low-pass filter, i.e., one which is arranged outside the two integrated circuits, with this low-pass filter deriving the tuning voltages for the voltage-controlled oscillator from the control signals.

From an integration point of view, it is desirable to eliminate external discrete components. In addition thereto, the spatial separation of both the IC kit and the external low-pass filter presents a possible source of faults with respect to the DC and AC voltage behaviour of the control loop due to noise coupling owing to the voltage drop, as well as a capacitive or inductive coupling.

SUMMARY OF THE INVENTION

It is one object of the invention to further embody the conventional IC kit in such a way that the external components required for the low-pass filter can be omitted, hence with the function thereof being replaced by integrated circuit portions. Relative thereto, care is to be taken that no more than the two already existing lines are required for transmitting the voltage control signals to the second integrated circuit. The solution to the problem resides in the digital transmission of the phase comparison signals and, additionally, in the inclusion of the low-pass filter in the IC kit as a digital low-pass filter.

In accordance with the principles of the invention, a first integrated circuit includes a phase-comparison stage with a digital low-pass filter and a second integrated circuit includes a voltage-controlled oscillator of a phase-locked loop. Digital control signals are applied to the second integrated circuit via a connecting line. The second integrated circuit contains a counter for counting the clock signal and the reset input thereof is connected to a second connecting line conducting the corresponding data clock signals. The second integrated circuit further includes a shift register having its clock input connected to the second connecting line, and having its serial input connected to the first connecting line. The second integrated circuit contains a storage device having a parallel input connected to the parallel output of the shift register, and having an enable input connected to a counter-reading output of the counter selected such that the following relationship applies: $X/F \geqq 1/Fd$ ($X$=numerical value of x; $F$=frequency of the clock signals and $Fd$=frequency of the data clock signals.) The second integrated circuit includes a digital-to-analog converter having its input connected to the parallel output of the storage device and its output connected to the control input of the oscillator.

In accordance with the invention, it is possible to do without an external integrating circuit for the control signals, and at most only two connecting lines are required for transmitting the control signals; in a modified arrangement in accordance with the invention even only one such connecting line is required.

BRIEF DESCRIPTION OF THE DRAWINGS

The invention will now be better understood from a reading of the following detailed description in greater detail with reference to FIGS. 1 to 5 of the accompanying drawing, in which.

DETAILED DESCRIPTION

Figure 1:
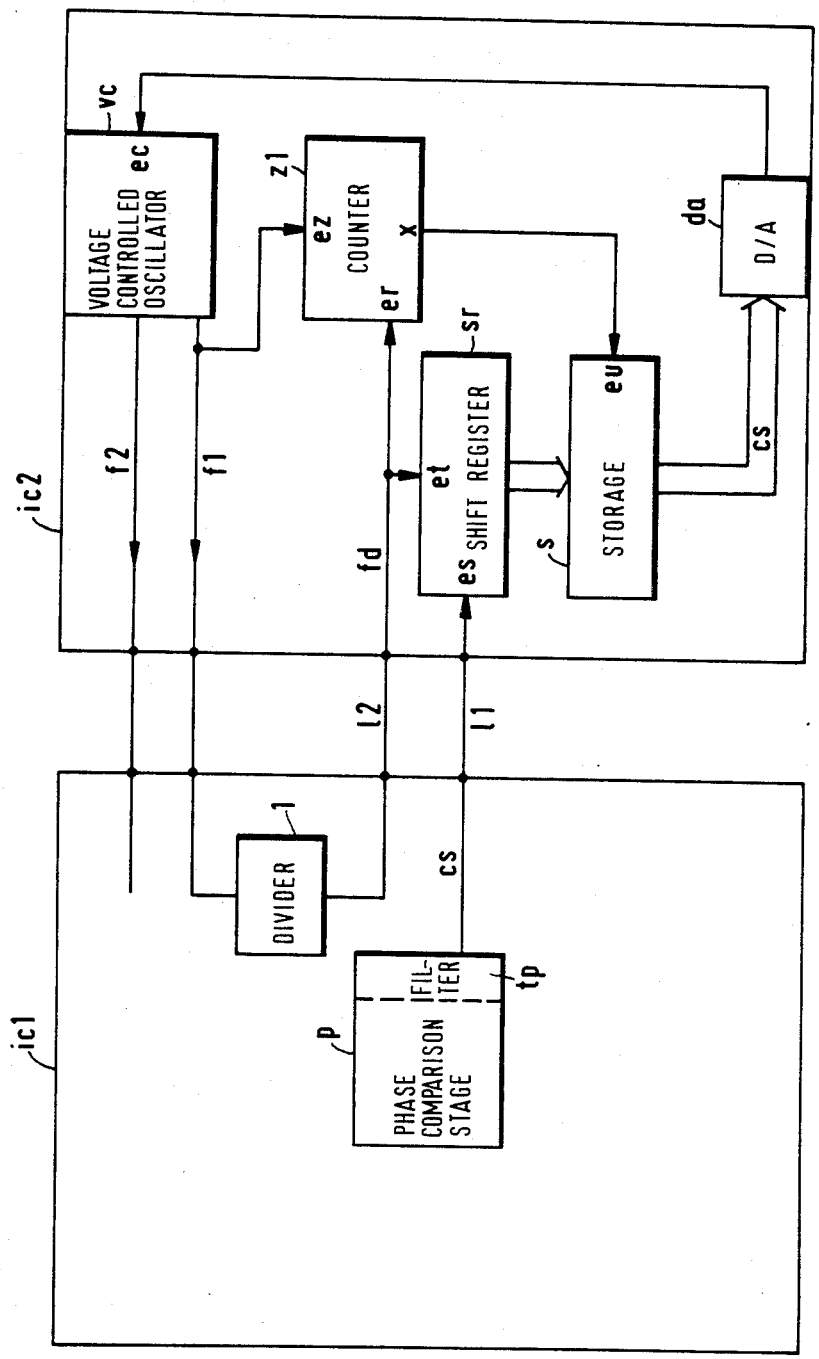
FIG. 1 schematically and by way of a block diagram, shows the partial circuits of the IC kit essential to the invention.

FIG. 1, schematically and in the form of a block diagram, shows a portion of the IC kit consisting of the first integrated circuit ic1 and of the second integrated circuit ic2. It is important with respect to the invention, that these parts together form a phase-locked loop (PLL), with the two essential partial circuits thereof being divided among the two integrated circuits. Thus, in the first integrated circuit ic1 there is contained, amongst others, the phase-comparison stage p with a digital low-pass filter tp at its output, whereas the voltage-controlled oscillator vc is arranged in the second integrated circuit ic2. According to the invention, the control signals cs for controlling the voltage of the oscillator vc, are transmitted via the first connecting line 11 from the first integrated circuit ic1 to the second integrated circuit ic2. These control signals, in accordance with a feature of the invention, are digital signals shown as curve c in FIG. 2.

Figure 2:
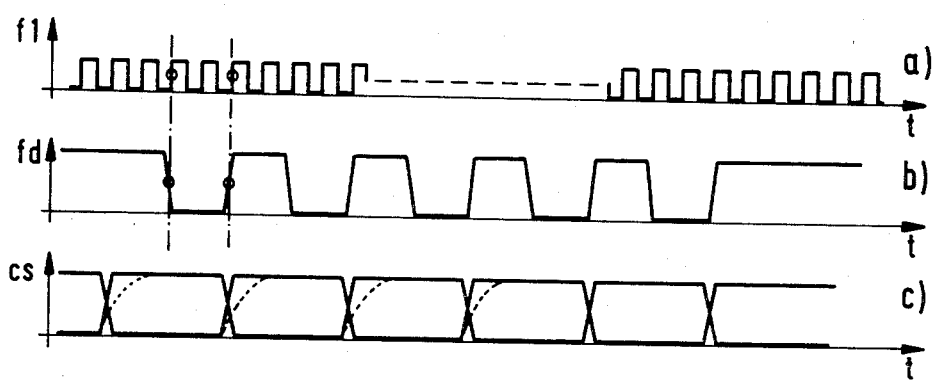
FIG. 2 shows time diagrams of three signals appearing in the arrangement according to FIG. 1.

Data clock signals fd are transmitted on the second connecting line 12 for the time-coordinated transmission of the digital control signals cs. Curve b of FIG. 2 shows the data clock signals fd as a function of time. The data clock signals fd can be formed in a suitable stage within the first integrated circuit ic1, to the input of which there is fed one of the clock signals f1, f2 produced by the voltage-controlled oscillator vc and, consequently, by the clock oscillator. The signal curves as functions of time as shown in FIG. 2 require that the data clock signal fd is derived from the first clock signal f1 by means of a frequency divider 1 whose divisional number is 4.

The second integrated circuit ic2 contains a first counter z1 having a counting input ez for receiving the first clock signal f1 of the voltage-controlled oscillator vc. Accordingly, the first counter z1 counts these clock pulses. Counter z1 has a reset input er connected to the second connecting line 12, so that the data clock signals fd are fed thereto.

Moreover, the second integrated circuit ic2 contains a shift register sr having its series input es coupled to the first connecting line 11 for receiving the digital control signals cs. The clock input et of the shift register sr is connected to the second connecting line 12 and is thus supplied with the data clock signals fd. The parallel output of the shift register sr is connected to the parallel input of a storage device s. Storage device s has a parallel output connected to the parallel input of a digital-to-analog converter da. Storage device s has an enable input eu connected to the single counter-reading output x of the first counter z1. This counter-reading output x chosen such that with respect to the numerical value X associated therewith, as well as with respect to the frequency F of the clock signals f1, f2 and the frequency Fd of the data clock signals fd, there applies the following relationship:

$$X/F \geq 1/Fd.$$

If the arrangement according to the invention as shown in FIG. 1 operates with a positive logic, the reset input er of the first counter z1 is reset in response to the more negative level L of two binary signal levels H, L. The enable input eu of the storage device s, however, responds to a corresponding H-level at the counter-reading output x. In other words, in response to the appearance of an H-level, the digital signals appearing at the parallel output of the shift register sr, are written into the storage device s. This writing only takes place at the end of a data word transmitted on the first connecting line 11, with this end being determined by the disconnection of the data clock signal fd and the clamping of the second connecting line 12 to a permanent H level as shown in curve b of FIG. 2. Owing to this permanent H level, the first counter z1 can reach the counter reading X, and consequently, the writing of the data into the storage device s can begin. During the appearance of the data clock signal fd, the first counter z1 cannot reach the counter reading X due to the L level periodically contained in the data clock signal fd which resets first counter z1. Due to the temporal assignment of the data clock signals fd to the duration of the control signals cs, as well as due to the partial circuits z1, da, sr, as provided for the second integrated circuit ic2, the two connecting lines are sufficient in the case of a digital control signal transmission.

The (time) relation between the digital control signals cs and the data clock signals fd can be chosen such that the shifting of the data within the shift register sr only takes place after a stationary state has been reached again in the individual stages compared with the preceding shifting cycle, that is when the data are stable. In FIG. 2, this is indicated on the left by the edges of the data clock signal fd marked by two small circles. At the falling edge the data are read in at the input, and at the rising edge they are shifted.

Figure 3:
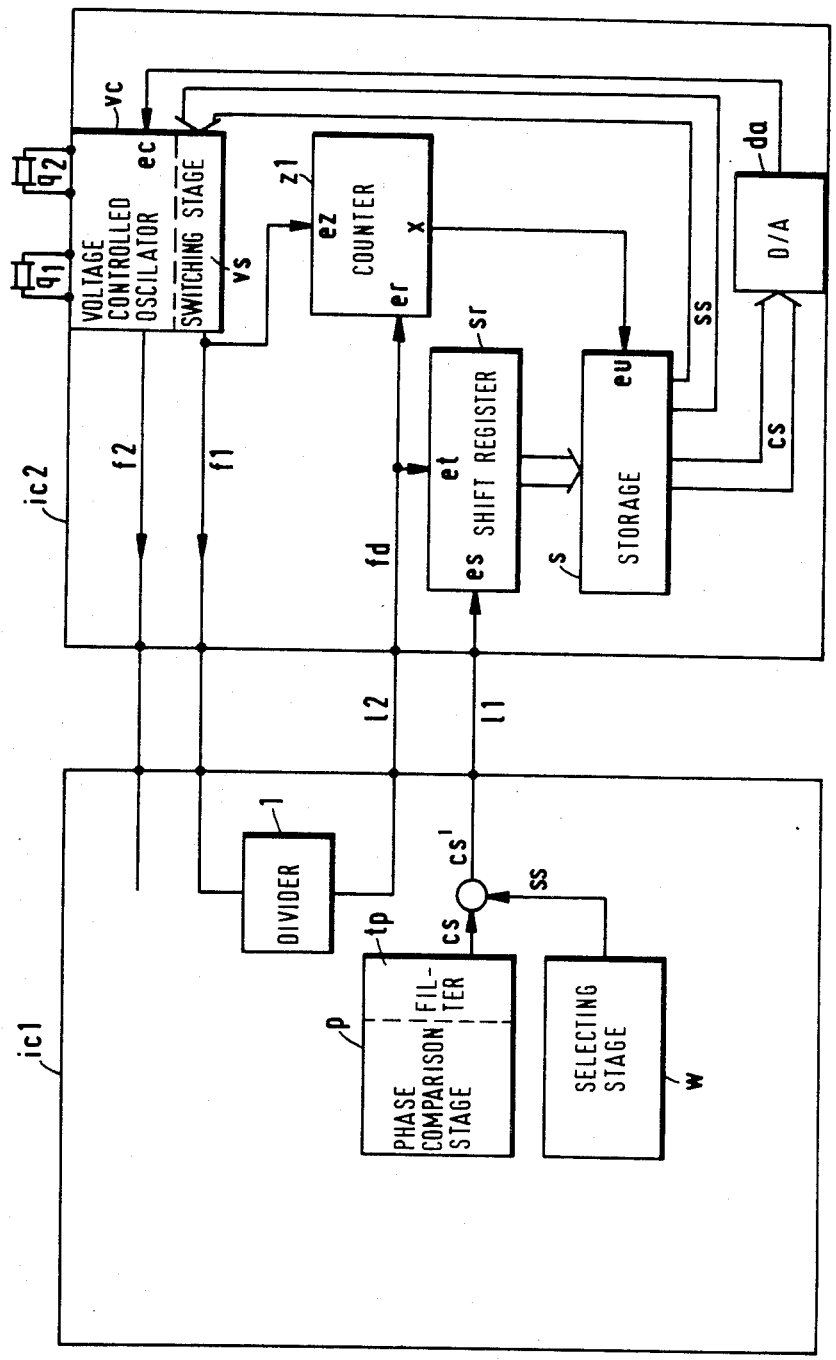
FIG. 3 shows a further embodiment of the arrangement according to FIG. 1.

FIG. 3 shows a further embodiment of the arrangement according to FIG. 1 for multi-standard color television receivers. In this case, the clock oscillator is designed as a crystal oscillator comprising several crystals q1, q2. The rated frequency of the crystals is an integer multiple, preferably four times of the reference carrier frequency of different television standards. Thus, for example, the crystal q1 may be provided for the PAL standard, and the crystal q2 may be provided for the NTSC standard. Arrangements employing a third crystal for the SECAM standard are also possible. In this further embodiment, not only are the digital control signals cs transmitted over the first connecting line 11, but also the corresponding switching signals ss which are produced in the first integrated circuit ic1 with the corresponding selecting stage w.

Both the shift register sr and the storage device s have a sufficient number of stages to hold a data word sc' consisting of the digital control signals cs and of the switching signals ss. The outputs for the stages of the storage device s which are provided for the switching signals ss, are connected to the inputs of the switching stage vs of the oscillator vc. As in the arrangement of FIG. 1, the output of the digital-to-analog converter da is connected to the control input ec of the oscillator vc.

Figure 4:
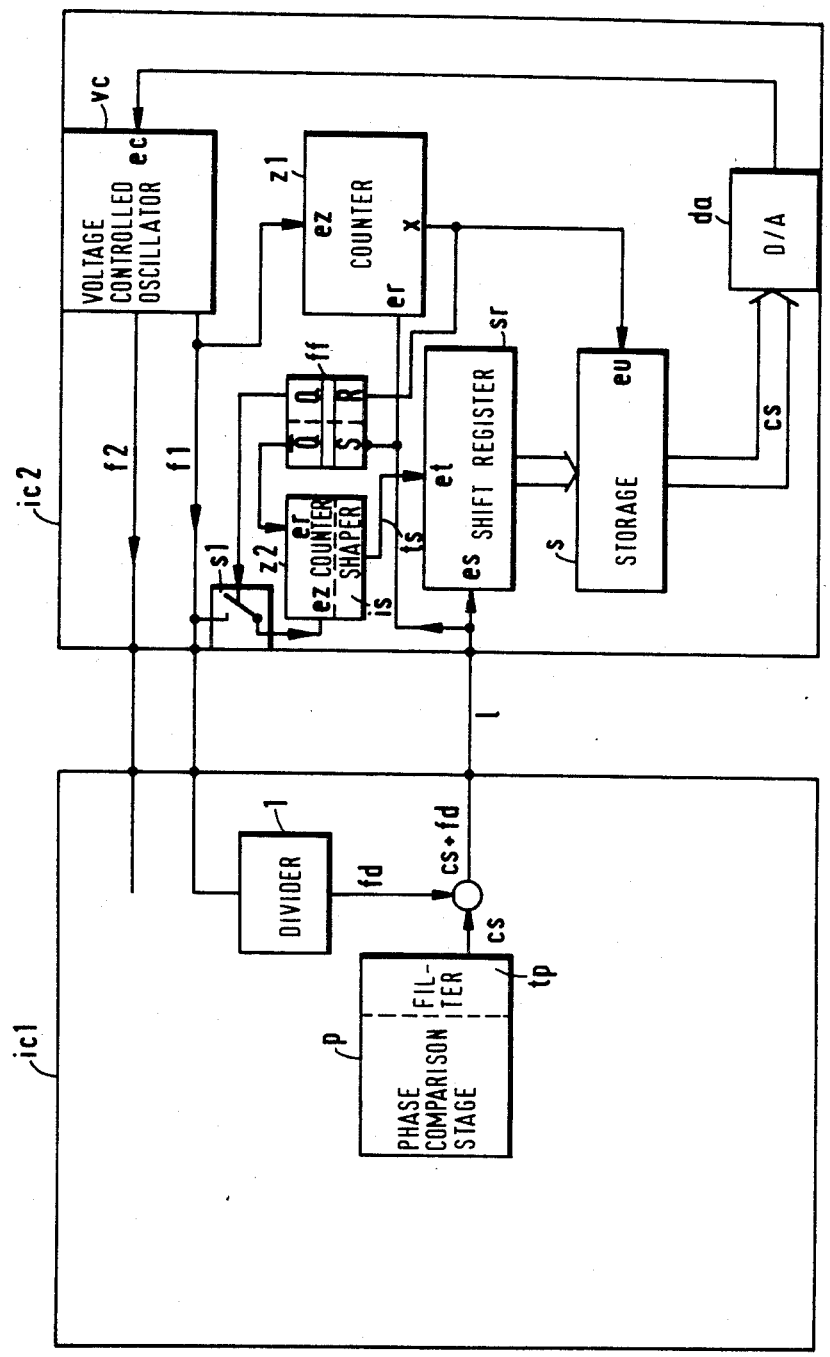
FIG. 4, schematically and by way of a block diagram, shows a modification of the IC kit according to the invention employing only one connecting line for the control signals.

FIG. 4 shows such a modification of the invention wherein one single connecting line 1 is required for transmitting the digital control signals cs. Relative thereto, in the integrated circuit ic1 the control signals cs are correspondingly combined with the data clock signals fd.

In integrated circuit ic2, in addition to the stages provided for in the arrangements according to FIGS. 1 and 3, there is provided a second counter z2, an electronic switch s1 and a RS storage flip-flop ff. The first clock signal f1 is applied to the counting input ez of the second counter z2 via the switching section of the electronic switch s1. The counting capacity of the second counter z2 is equal to the ratio of the clock frequency F to the data clock frequency Fd.

The connecting line 1 is connected to the serial input es of the shift register sr and to the reset input er of the first counter z1. The single counter-reading output x of counter z1 is connected to the enable input eu of the storage device s and to the R input of the RS storage flip-flop ff. The inverting S input of flip-flop ff is connected to the connecting line 1. The $\bar{Q}$ output of flip-flop ff is connected to the reset input of the second counter z2, and the Q output is connected to the control input of the electronic switch s1.

Figure 5:
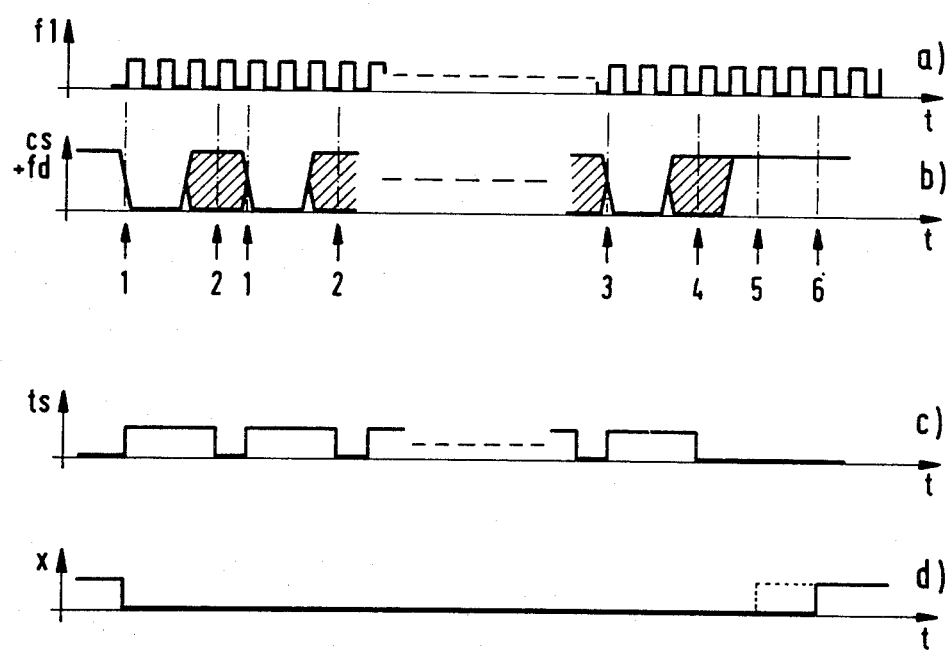
FIG. 5 shows signal curves as a function of time relating to various signals appearing in the arrangement according to FIG. 4.

FIG. 5 shows the signal waveforms occurring in the arrangement according to FIG. 4. Curve 5a shows the first clock signal f1, and curve 5b shows the combined control-data clock signal cs+fd. The hatchlined portions of curve 5b represent the digital data. Curve 5c shows the signal ts as applied to the clock input et of the shift register sr. Signal ts is produced by the pulse shaper is of FIG. 4 in such a way that the trailing edge thereof occurs in about the center of the second half of its pulse duration. For this purpose, the highest counter-reading output of the second counter z2 together with the preceding counter-outputs are applied to the input of the pulse-forming circuit adjusting the pulse / no pulse ratio.

Curve 5d shows the signal as appearing at the counter-reading output x of the first counter z1. The numerals 1 through 6 in FIG. 5b indicate various time positions which are essential to the mode of operation. The reference numeral 1 indicates the beginning of the shifting operation in the shift register sr. At the time position 2, the data are loaded into the shift register. At the time position 3, the last shifting pulse of the shown data word is started, and 4 indicates the last load time position. 5 and 6 indicate the time positions of writing the data word into the storage device s, with the writing being carried out, depending on the last data state, at one of these two time positions.

An advantage of the invention is that no external discrete components are required for producing the control voltage for the oscillator vc. Moreover, a considerable reduction in both the level dependence and the sensitivity to noise is achieved.

It should be apparent to those skilled in the art that the modification according to FIG. 4 may also be applied to the embodiment as shown in FIG. 3.

What is claimed is:

1. An IC kit for a color-television receiver with digital signal processing, comprising first and second integrated circuits which jointly contain a clock oscillator realized in the form of a phase-locked loop for producing two-phase clock signals;

said first integrated circuit containing a phase-comparison stage said second integrated circuit containing a voltage-controlled oscillator of the phase-locked loop, control signals for said phase-locked loop being applied via a maximum of two connecting lines between said first and said second integrated circuits, characterized in that:

said phase-comparison stage comprises a digital low-pass filter at its output;

said control signals are digital signals applied to said second integrated circuit by said first integrated circuit via a first one of said connecting lines; and said second integrated circuit comprising a first counter for counting a first one of said clock signals, and having a reset input connected to a second one of said connecting lines for receiving data clock signals during said control signals, a shift register having parallel outputs and having a clock input to said second one connecting line, and having a serial input connected to the said first connecting line;

a storage device having parallel inputs connected to said parallel outputs of said shift register and having an enable input connected to a single counter-reading output of said first counter said single counter-reading output being selected in accordance with the relationship $X/F \geq 1/Fd$ where X is the numerical value corresponding to said output, F indicates the frequency of said clock signals, and Fd indicates the frequency of said data clock signals; and a digital-to-analog converter having inputs connected to the outputs of said storage device, and having an output connected to the control input of the oscillator.

2. An IC kit in accordance with claim 1, wherein said oscillator is a crystal oscillator selectively operable with at least two crystals, each of said crystals having a rated frequency being an integer multiple of the reference carrier frequency of a different television standard, said oscillator includes a switching stage for selecting one of said at least two crystals to be used by said oscillator, said control signals comprise switching signals for selecting one of said crystals, and said parallel outputs of said storage device includes outputs associated with said switching signals which are connected directly to said switching stage.

3. An IC kit in accordance with claim 2, wherein said said integer multiple frequency of each of said crystals is four times the reference carrier frequency of the corresponding television standard.

4. An IC kit for a color-television receiver with digital signal processing, comprising first and second integrated circuits which jointly contain a clock oscillator realized in the form of a phase-locked loop for producing two-phase clock signals;

said first integrated circuit containing a phase-comparison stage said second integrated circuit containing a voltage-controlled oscillator of the phase-locked loop, control signals for said phase-locked loop being applied via one connecting line between said first and said second integrated circuits, characterized in that:

said phase-comparison stage comprises a digital low-pass filter at its output;

said control signals are digital signals applied to said second integrated circuit by said first integrated circuit via said one connecting line; and said second integrated circuit comprising a first counter for counting a first one of said clock signals, and having a reset input connected to said connecting line for receiving data clock signals during said control signals, a shift register having parallel outputs, a clock input, and having a serial input connected to the said connecting line, a flip-flop having a first control input coupled to said single counter-reading output, a second control input coupled to said connecting line, a first output coupled to said electronic switch control input, and a second output coupled to a reset input of said second counter;

a storage device having parallel inputs connected to said parallel outputs of said shift register and having an enable input connected to a single counter-reading output of said first counter said single counter-reading output being selected in accordance with the relationship $X/F \geq 1/Fd$ where X is the numerical value corresponding to said output, F indicates the frequency of said clock signals, and Fd indicates the frequency of said data clock signals; and a second counter having a counting capacity equal to the ratio of the frequency of said clock signals to said data clock frequency, an electronic switch having a control input and responsive to a first control signal at said first control input for connecting said first clock signal to said second counter, a pulse shaping circuit having inputs coupled to the outputs of said second counter and having an output coupled to said shift register clock input, said pulse shaping circuit adjusting the pulse/no pulse ratio of signals at its output in accordance with the outputs of said second counter, a digital-to-analog converter having inputs connected to the outputs of said storage device, and having an output connected to the control input of the oscillator.

5. An IC kit in accordance with claim 4, wherein said oscillator is a crystal oscillator selectively operable with at least two crystals, each of said crystals having a rated frequency being an integer multiple of the reference carrier frequency of a different television standard, said oscillator includes a switching stage for selecting one of said at least two crystals to be used by said oscillator, said control signals comprise switching signals for selecting one of said crystals, and said parallel outputs of said storage device includes outputs associated with said switching signals which are connected directly to said switching stage.

6. An IC kit in accordance with claim 5, wherein said integer multiple frequency of each of said crystals is four times the reference carrier frequency of the corresponding television standard.

7. An IC kit in accordance with claim 4, wherein said flip-flop is an RS flip-flop said first control input is the R input thereof, said second control input is the S input thereof, said first output is the non-inverting output thereof, and said second output is the inverting output thereof.

* * * * *